United States Patent
McNee et al.

(10) Patent No.: US 9,307,741 B1
(45) Date of Patent: Apr. 12, 2016

(54) RETRACTABLE PET BARRIER

(75) Inventors: Martha McNee, Kalamazoo, MI (US); Russell Randall, Land O' Lakes, FL (US); Andrew Hinkley, Richland, MI (US)

(73) Assignee: THE PET BARRIER, LLC, Kalamazoo, MI (US)

( * ) Notice: Subject to any disclaimer, the term of this patent is extended or adjusted under 35 U.S.C. 154(b) by 1109 days.

(21) Appl. No.: 12/408,792

(22) Filed: Mar. 23, 2009

Related U.S. Application Data

(60) Provisional application No. 61/070,511, filed on Mar. 24, 2008, provisional application No. 61/201,099, filed on Dec. 6, 2008.

(51) Int. Cl.
*A01K 1/00* (2006.01)

(52) U.S. Cl.
CPC .......................................... *A01K 1/00* (2013.01)

(58) Field of Classification Search
CPC .......... A01K 1/035; A01K 1/00; A01K 31/00
USPC .......... 119/416, 482, 484, 501; 160/315, 318, 160/28, 90, 92, 97, 98
IPC ..................................... A01K 1/00, 1/03, 31/00
See application file for complete search history.

(56) References Cited

U.S. PATENT DOCUMENTS

| | | | |
|---|---|---|---|
| 3,732,913 A * | 5/1973 | Wrono ........................... | 160/133 |
| 5,660,144 A | 8/1997 | Venti | |
| 6,089,302 A | 7/2000 | Britt | |
| 6,123,321 A | 9/2000 | Miller | |
| 6,135,423 A | 10/2000 | Johnson | |
| 6,142,701 A | 11/2000 | Falcon | |
| 6,302,179 B1 * | 10/2001 | Miller ........................... | 160/23.1 |
| 6,308,660 B1 * | 10/2001 | Coiro et al. ................... | 119/419 |
| 6,375,164 B1 | 4/2002 | Siegler et al. | |
| 6,375,165 B1 * | 4/2002 | Sherratt et al. ................ | 256/24 |
| 6,435,250 B1 | 8/2002 | Pichik et al. | |
| 6,575,435 B1 | 6/2003 | Kotzen | |
| 7,082,981 B2 * | 8/2006 | Perez, Jr. ....................... | 160/24 |
| 2007/0035161 A1 * | 2/2007 | Huisingh et al. .............. | 296/215 |

* cited by examiner

*Primary Examiner* — David Parsley
*Assistant Examiner* — Thien Thanh Pham
(74) *Attorney, Agent, or Firm* — Abelman, Frayne & Schwab

(57) ABSTRACT

A pet barrier includes a housing containing a barrier having a first end attached to a holding structure. The holding structure rotates with respect to the housing and the barrier is furled around the holding structure. The second end of the barrier is exposed from the housing and includes an elongated bar hook. The pet barrier also includes a tensioning mechanism including a spring assembly operably associated with the holding structure. An adjustment structure is provided for adjusting the tension of the spring assembly by rotational action and thereby adjusting tension in the barrier. To set the tension of the spring assembly, a brake is provided that locks the adjustment structure to with a portion of the housing and/or a portion fixed with respect to the housing. Constant retraction forces act upon the barrier as it is unfurled from around the holding structure.

21 Claims, 11 Drawing Sheets

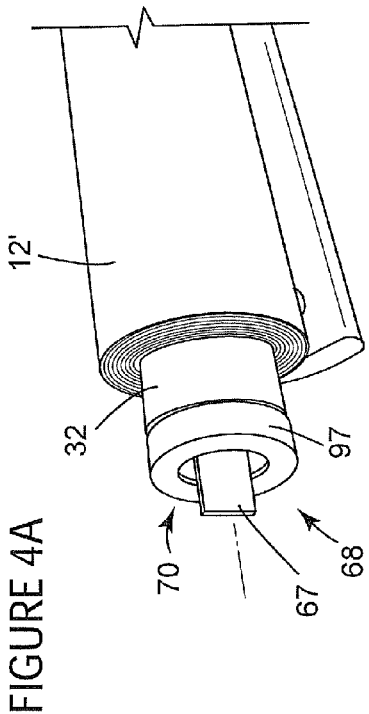
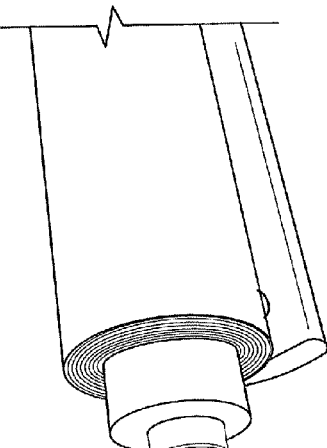
FIGURE 4A
FIGURE 4B

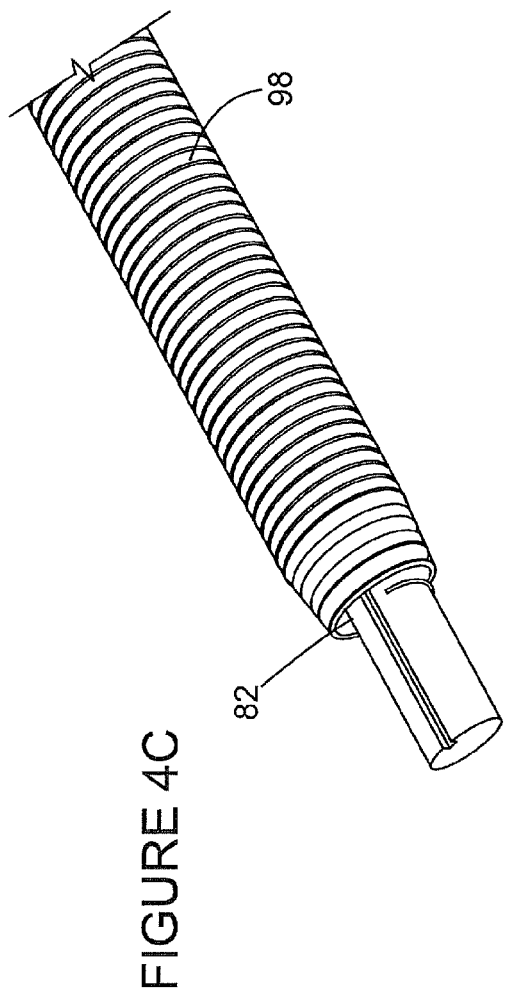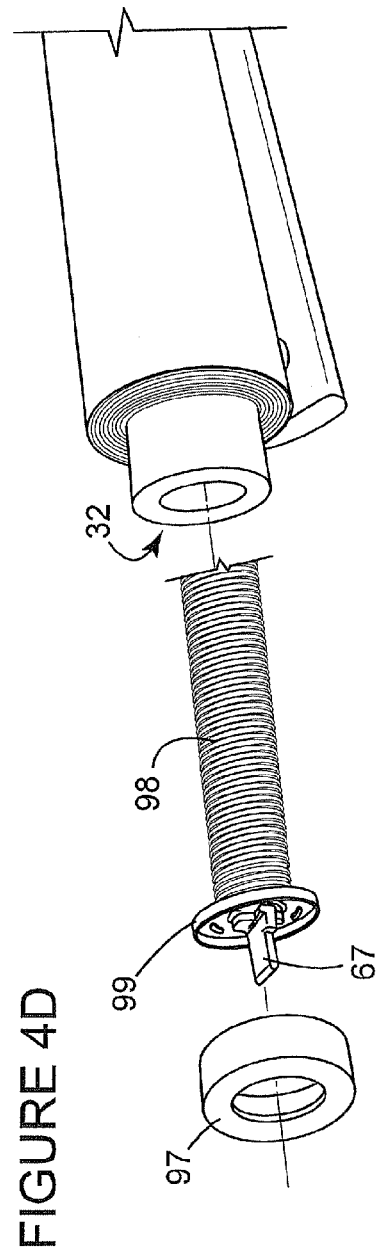
FIGURE 4C
FIGURE 4D

RETRACTABLE PET BARRIER

RELATED APPLICATIONS

This application claims priority under 35 U.S.C. §119 to U.S. Provisional Patent Application No. 61/070,511 filed on Mar. 24, 2008 entitled "Retractable Pet Barrier" and U.S. Provisional Patent Application No. 61/201,099 filed on Dec. 6, 2008 entitled "Retractable Pet Barrier", which are both incorporated by reference herein.

BACKGROUND OF THE INVENTION

1. Field of the Invention

This invention relates generally to the field of retractable pet barrier devices and methods of using retractable pet barrier devices, and more particularly to pet barrier devices wherein a door can be opened with the barrier extending from the device and closed with the barrier retracting, with features to allow a user to easily attach the barrier to and detach the barrier from the door.

2. Description of Related Art

Containing small pets within a home as one greets guests through an open door has been and continues to be a challenge for pet owners. Pets respond to a knock on the door or the ringing of the doorbell with boisterous enthusiasm. This typically results in the pet owner placing a leg in front of the pet and/or opening the door only a small amount. These physical methods of restraint are cumbersome, un-inviting to the guest, stressful for the pet and pet owner alike and generally unsuccessful.

There are several pet barrier devices available and in use today. Most are made of wood or plastic coated metal and are designed for stationary use between an open doorway or hallway. Once they are put in place they are a semi-permanent fixture until they are physically removed. In a busy household this could result in the barrier being positioned and repositioned several times a day. Although certain existing pet barriers may be effective, they are not convenient. Additionally, these conventional barriers are designed to be effective in an open doorway, which makes them impractical to use on an outside entry door.

Therefore, a need exists to provide an improved pet barrier and method for use, for instance, in a doorway used to enter into or exit out of a home, such as an outside doorway. The improved pet barrier and method of use must be attractive for mounting on the inside of a doorway, self contained, easily accessible, convenient to use and effective in providing both a physical and psychological barrier, for instances, for pets.

SUMMARY OF THE INVENTION

In view of the limitations of pet barriers present in the prior art the present invention provides an improved pet barrier and the method thereof.

It is another object of the present invention to provide an improved pet barrier and the method thereof which is a self contained pet barrier and method wherein the barrier is contained within the housing mounted substantially on the side of a door.

It is another object of the present invention to provide an improved pet barrier and the method thereof which allows the housing to be mounted bi-directionally.

It is a still further object of the present invention to provide an improved pet barrier and the method thereof such that an exposed second end of the barrier is designed to be releasably engaged to a receiving device mounted directly on the receiving door.

It is a still further object of the present invention to provide an improved pet barrier and the method thereof that the pet barrier is a tear and puncture resistant, opaque material providing physical and psychological barriers It is a still further object of the present invention to provide an improved pet barrier and the method thereof that the pet barrier is easily engaged and disengaged so provide either a barrier or a barrier-free entry.

It is yet another object of the invention to provide an improved pet barrier and the method thereof that allows for the tension of the barrier to be adjusted due to one's personal preferences, or to increase the tension when the tension decreased due to repeated use.

BRIEF DESCRIPTION OF THE DRAWINGS

The foregoing summary as well as the following detailed description of preferred embodiments of the invention will be better understood when read in conjunction with the appended drawings. For the purpose of illustrating the invention, there is shown in the drawings embodiments which are presently preferred. It should be understood, however, that the invention is not limited to the precise arrangements and instrumentalities shown in the drawings, where:

FIGS. 4A through 4D depict an example of a spring assembly for maintaining tension on the barrier;

DETAILED DESCRIPTION OF THE INVENTION

Figure 1:
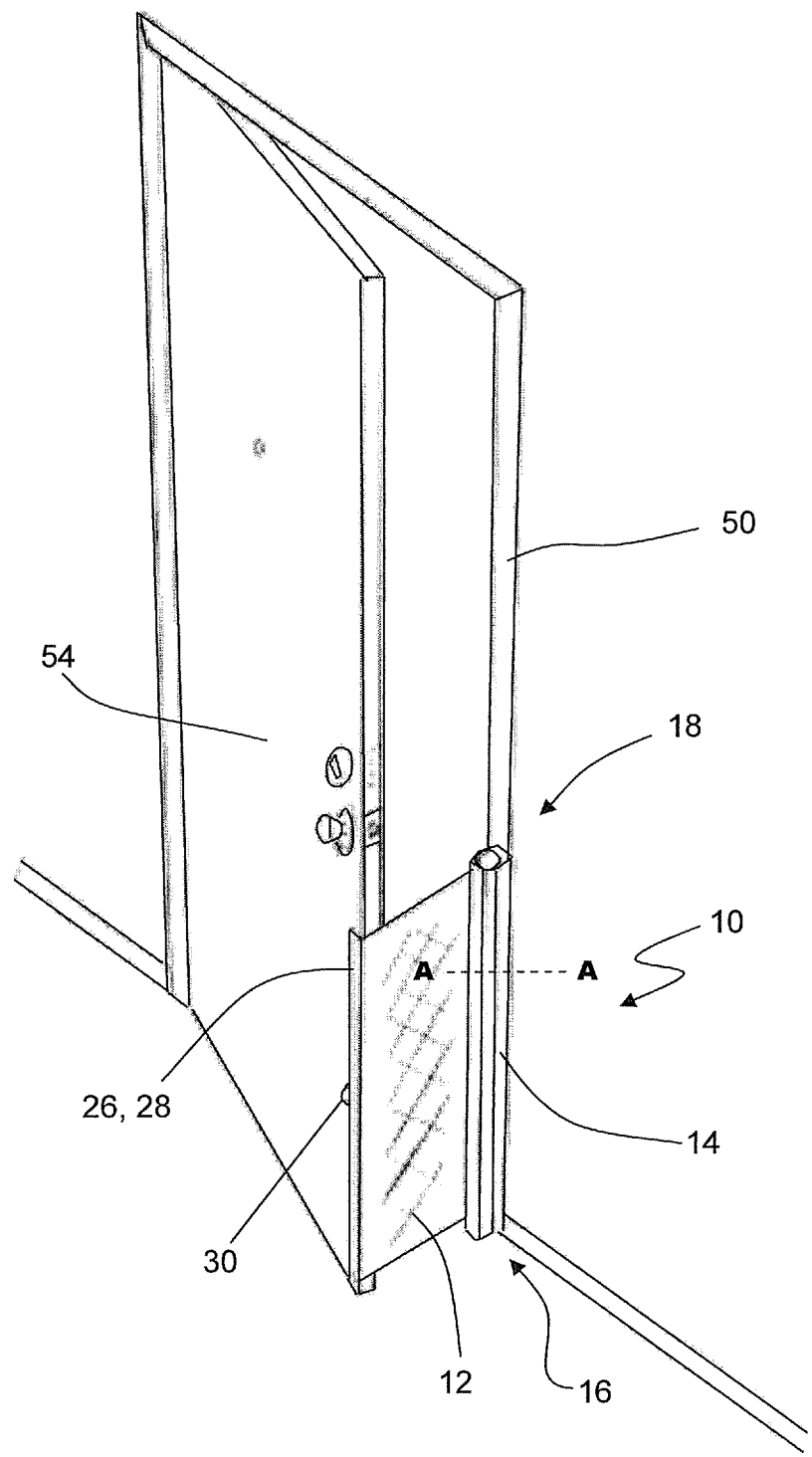
FIG. 1 is a perspective view the pet barrier device herein attached to an ajar door.
Figure 2A:
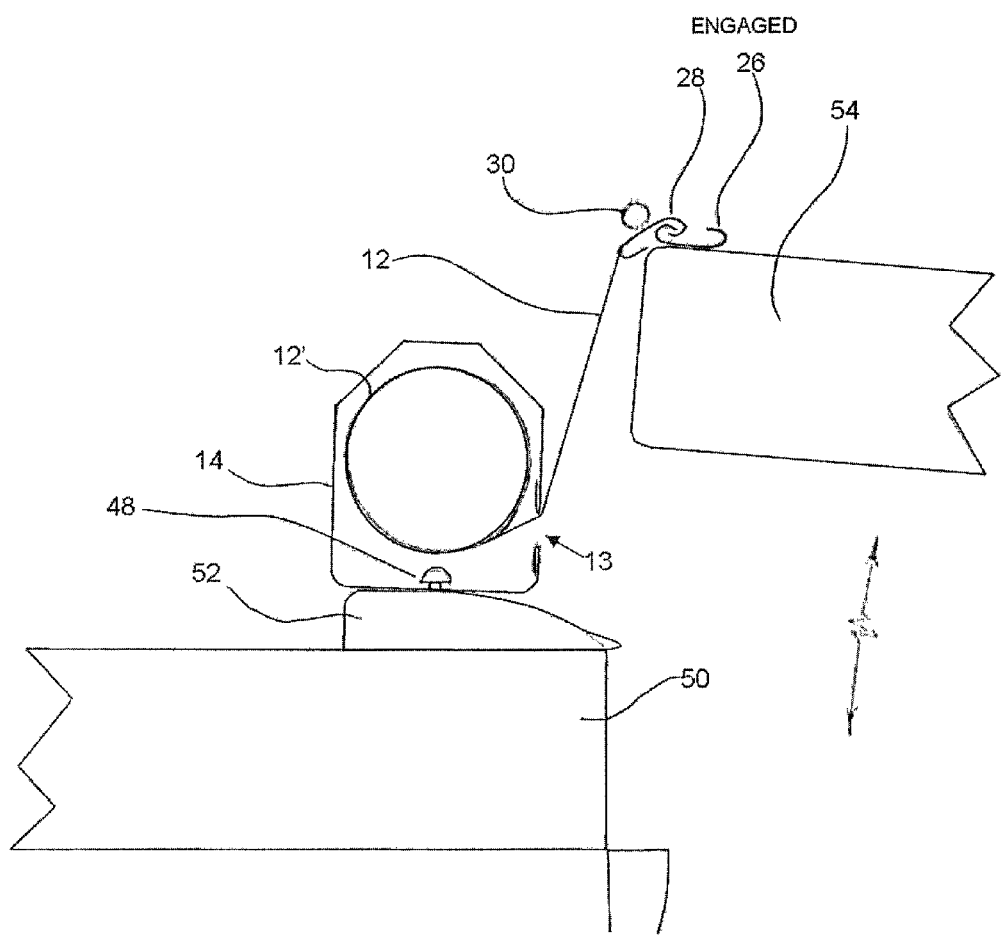
FIG. 2A is a cross-sectional view of the housing of the pet barrier of FIG. 1 taken along line A-A of FIG. 1 represented with the door slightly open.
Figure 2B:
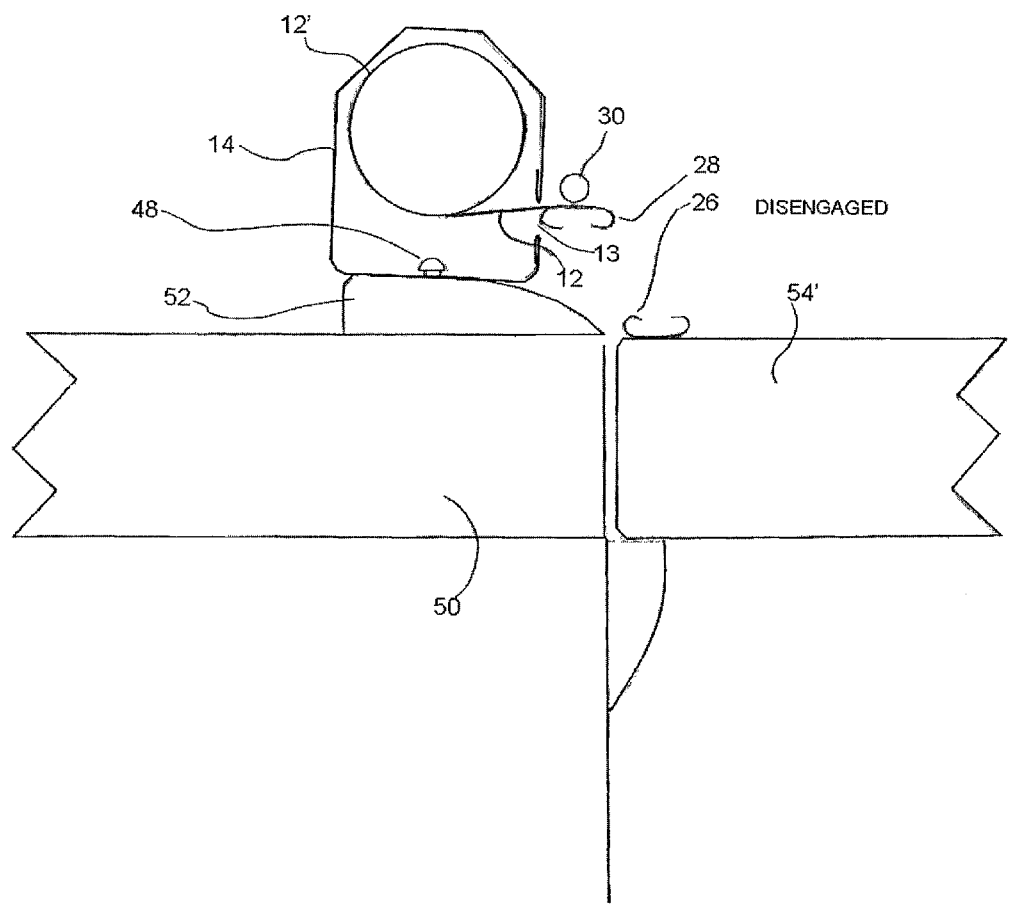
FIG. 2B is a cross-sectional view of the housing of the pet barrier of FIG. 1 taken along line A-A of FIG. 1 represented with the door shut.

Referring in general to the embodiment shown in FIGS. 1, 2A and 2B, an improved pet barrier apparatus 10 is shown. The pet barrier 10 includes a housing 14 for housing the barrier 12. The housing 14 includes a first end 16 and a second end 18, and is configured and dimensioned for mounting upon a wall 50 with one or more mechanical fasteners 48, for instance, proximate the door jamb at the stile or vertical edge of the door that opens. In certain installations, the housing 14 can be mounted to the wall 50 through trim 52 that surrounds many doors. (FIGS. 2A and 2B). The housing 14 can alternatively be mounted directly to the wall, e.g., where no door trim is provided, or even further from the door jamb on the wall 50, for instance, to the left of the position shown in FIGS. 2A and 2B.

The barrier membrane 12 includes an elongated bar hook 28 at an exposed end (i.e., exposed from the housing 14), with the reminder of the barrier membrane 12' in a furled configuration within the housing 14 (e.g., with one end of the barrier 12 attached to a holding structure or drum 32 and the other end exposed from the housing 14). An aperture 13 is provided that generally is an elongated aperture or slit along a portion of the housing corresponding to the position and dimension of the barrier 12. For example, the aperture 13 can be on a portion of the housing that is approximately perpendicular to the wall 50 and facing the door, as shown in FIGS. 2A and 2B. The aperture 13 has width dimension (i.e., top to bottom as shown in FIGS. 2A and 2B) that is sufficiently large so as to minimize the angle that the barrier must bend when the door is open. Further, the edges of the housing 14 surrounding the aperture 13 are rounded or otherwise smoothed so as to avoid undesirable chafing or cutting of the barrier 12. For instance, the edges of the housing 14 surrounding the aperture 13 can include a suitable grommet or molding, they can be molded to an appropriate rounded shape, or they can be formed as an outer surface of an edge bend, e.g., where the end is bent onto itself to provide a smooth edge that will not cut or chafe the barrier 12.

Figures 5A, 5B:
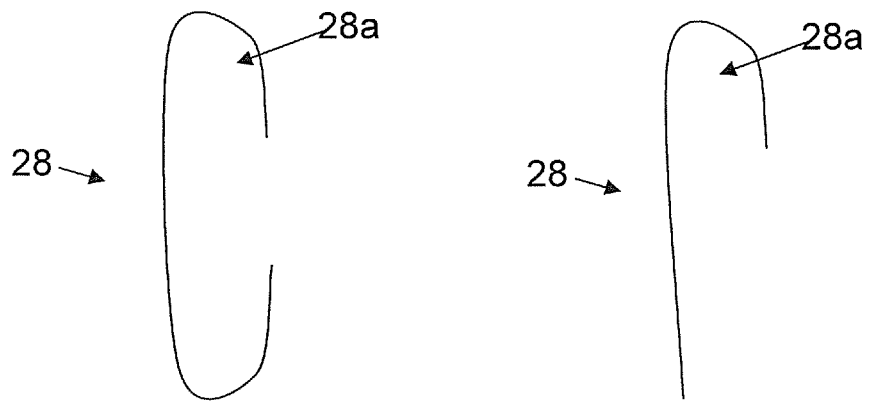
FIGS. 5A through 5C depict various embodiments of cross sectional shapes for an elongated bar hook attached to the barrier.
Figure 5C:
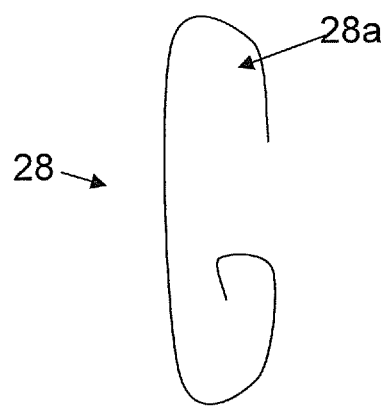

When the barrier 12 is to be engaged, the elongated bar hook 28 connects to another elongated bar hook 26, which is attached to a door 54. Referring, for instance, to FIGS. 5A-5C, various cross-sectional configurations for an elongated bar hook 28 can be used. FIG. 5A shows an elongated bar hook 28 having a C-shaped configuration, with a hooking portion 28a (the inside surface of the top end of the "C" as shown) that hooks into a corresponding hooking portion of the elongated bar hook 26 (where the barrier 12 is attached to the other end of the "C" on the outside surface). FIG. 5B shows an elongated bar hook 28 having a J-shaped configuration, with a hooking portion 28a at the loop portion of the "J" (where outside surface of the other end of the "J" is attached to the barrier 12). FIG. 5C shows an elongated bar hook 28 having a G-shaped configuration, with a hooking portion 28a at the top portion of the "G" as shown (where outside surface of the other end of the "G" is attached to the barrier 12).

The elongated bar hook 28 included at the end of the barrier 12 can be of similar configuration and dimension as the elongated bar hook 28 attached to the door. Optionally, a knob or handle 30 can be attached to (or integral with) the elongated bar hook 28, thereby facilitating the coupling of the elongated bar hook 28 to the elongated bar hook 26. In certain embodiments, and as described further herein, the barrier membrane 12' in a furled configuration within the housing 14 such that as one pulls the barrier membrane 12, and as it is attached to the door (via attachment elongated bar hook 26 and elongated bar hook 28), it remains under tension. In further embodiments, this tension is maintained due to constant spring force upon a holding structure (e.g., drum or tube) for the furled barrier 12', as described further herein.

In certain embodiments, for convenience of operation and to facilitate one-handed operation, the length of the elongated bar hooks 26, 28 are sufficiently long so that no other attachment is needed between the barrier and the door. This is advantageous, e.g., compared to certain conventional approaches, where plural hooks are used, for instance, and inserted into corresponding eyes. In addition, where the elongated bar hooks 26, 28 are at least as long as the barrier 12, equal tension is applied across the entire width of the barrier 12, thereby reducing the likelihood of excess fatigue and tension on the barrier 12 or other components associated with localized pressure points in conventional barrier structures.

When the door 54 is in an open position, a portion of the barrier membrane 12 is extended (FIG. 2A). In the closed position of the door 54' (FIG. 2B), the barrier membrane 12 retracts into the housing 14, where most is contained in a rolled configuration 12'. Notably, in this position, ready access to the barrier is provided since the aperture 13 and/or the elongated bar hook 28 are configured and dimensioned to prevent the elongated bar hook 28 from recessing into the aperture 13. For instance, in one embodiment, a portion of the elongated bar hook 28 is wider than the aperture 13 (e.g., where the cross section is in the shape of a C, where the top portion of the C-shaped cross section (corresponding to the top of the letter C) hooks into the elongated bar hook 26, and the bottom portion of the C-shaped cross section of the elongated bar hook 28 is formed such that it is at least slightly larger than the aperture 13 so that when the barrier 12 is in the retracted position the bottom portion of the C-shaped cross section elongated bar hook 28 contacts edges of aperture 13 and thereby is prevented from retracting completely into the housing 14). In another embodiment, the length of the elongated bar hook 28 is greater than the length of the aperture 13, whereby in the retracted position, the ends of the elongated bar hook 28 rest upon portions of the housing 14 at the ends 16, 18, or end caps as shown further herein, e.g., positioned and attached at the ends 16, 18 of the housing 14. Either of these embodiments allow a user to extend the barrier 12 into position and connect the elongated bar hooks 26, 28 with ease, and preferably as a single-handed operation, without inconveniently being required to grasp the barrier 12 from inside the housing 14. This is in contrast to conventional approaches, whereby a latch can need to be articulated in conjunction with, or prior to, extending the barrier 12. In addition, due to the constant tension in certain embodiments, single handed operation by a user is further facilitated.

In general, for application to conventional doors, the length of the housing 14 (between ends 16, 18) can be, for instance, about 12 inches to about 48 inches, preferably about 24 inches to about 36 inches. In one embodiment particularly well suited for most in-home installations, the length is approximately 32 inches to about 33 inches. The barrier material 12 can have a width (i.e., top to bottom as shown in FIG. 1) of about 11 inches to about 47 inches, preferably about 23 inches to about 35 inches. In one embodiment particularly well suited for most in-home installations, the width of the barrier 12 is approximately 31 inches. In addition, the length of the barrier 12 (i.e., when unfurled to the maximum extend allowable) should be at least as long as the distance of conventional door travel. For instance, for doors with about 180 degrees of travel, the length of the barrier material 12 should be at least about twice the width of the door, or about 48 inches to about 72 inches. In certain applications, the door can travel 270 degrees (e.g., an outward swinging corner door), thus additional length can be required. Note that the barrier can be much longer than needed, for instance, where a user can self-repair the barrier itself. For example, the elongated bar hook 28 can be removed form the end, a section pulled out and cut (e.g., a section that is undesirably soiled, torn, and/or excessively worn). For convenience, in this embodiment, the barrier can be pre-marked, so that a user is informed as to where an ideal cut position is, for instance, based upon the door size and degree of opening of the door.

The material of the barrier 12 is a tear and puncture resistance material that is preferably optically opaque. This provides a physical and psychological barrier to a pet to be contained. For instance, suitable materials include plastics or fiber reinforced plastics, having a thickness of about 5 mils to about 30 mils. A particularly suitable material includes a type of vinyl commercially known as "tent vinyl," which is fire retardant and mildew resistant, having a thickness of about 10 mils.

The elongated bar hook 28 can be attached to the end of the barrier 12 by any suitable fastening system or method that provides sufficient strength and durability to withstanding the tension of the barrier 12 when extended, and any intervening forces such as being pushed or struck by a pet, and also to allow for repeated use over time without detachment. In one embodiment, the end of the barrier 12 can include one or more reinforcing members (e.g., formed of a material of suitable strength such as a rigid plastic materials, cellulose based materials (e.g., wood, bamboo, paper-based), or metal material, or a suitable strength flexible material (which can be more rigid than the barrier 12) such as a fabric material or plastic material). The one or more reinforcing members can be along the length of the end of the barrier 12, along a substantial portion of the length of the end of the barrier 12, or at select portions along the end of the barrier 12. The elongated bar hook 28 can be, for instance, riveted to the reinforced member(s).

In addition, the elongated bar hook 26 can be secured to the door by any one or more or a variety of fasteners and/or adhesives. For instance, in certain embodiments, the elongated bar hook 26 can be fastened with screws or other mechanical fasteners. In other embodiments, suitable adhesives can be used, including double sided foam tape (e.g., 3M 4016 commercially available from 3M, St. Paul, Minn.). In further embodiments, other fasteners can be used such as a suitable hook and loop strips (e.g., Velcro® 5-MVA#8 hook and loop 1000) (or generic hook and loop-fastener materials). In other embodiments, a kit can incorporate a plurality of fastening systems, including but not limited to adhesives and hook and loop fasteners. Further, the elongated bar hook 26 can be pre-drilled for mounting convenience for the user or installer.

The housing 14 is mounted upon a wall 50 (or optionally through trim 52) with one or more mechanical fasteners 48, including but not limited to screws, bolts, or nails. In certain preferred embodiments, for ease of installation, one or more mechanical fasteners 48 are inserted into the wall 50 or trim 52, where a head of the fastener 48 remains separated from the surface of the wall 50 or trim 52, leaving a gap therebetween. This avoids the need for external brackets or fasteners to support the housing 14. Accordingly, the surface of the housing 14 includes corresponding holes within which the head of the fasteners can be inserted. For instance, one or more keyhole shaped apertures having a screw head retaining slot can be provided on the housing 14. In certain embodiments, a user or installer can have the option of inverting the housing 14 (e.g., to maintain compatibility with doors that open on either the right or left side). Accordingly, modified key-hole shaped apertures having more than one screw head retaining slots can be provided, e.g., each modified key-hole shaped aperture having one screw head retaining slot positioned and configured for one orientation of the housing 14 and another screw head retaining slot positioned and configured for the inverted orientation.

As set forth above, in certain preferred embodiments, and in particular when the apparatus 10 is installed and in use, the barrier 12 is under tension. That is, when the barrier 12 is not attached to the door 54, and when it is attached (by interconnection of elongated bar hooks 26, 28, tension is applied to the barrier 12 from the roll 12' and its associated mechanism(s), various embodiments of which are described further herein.

Figure 3A:
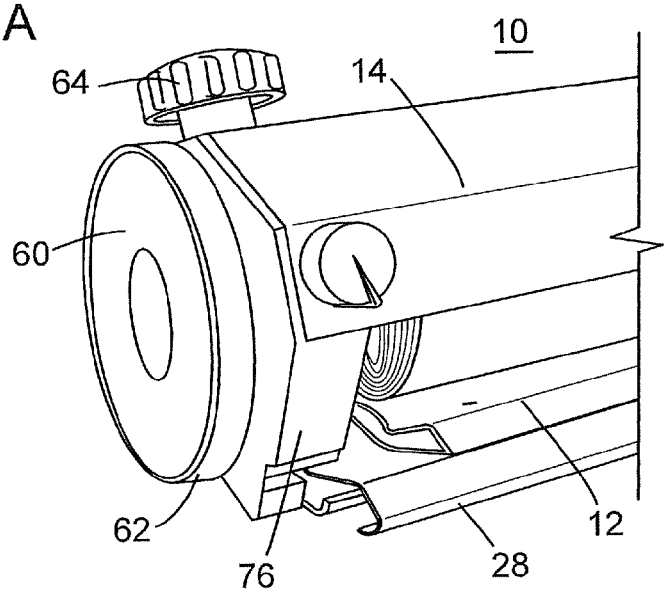
FIG. 3A shows an enlarged perspective view of a pet barrier device herein depicting another embodiment of a tensioning mechanism.

An embodiment of a tensioning mechanism is shown and described with respect to FIGS. 3A through 3F. FIG. 3A shows an enlarged perspective view of an end of the apparatus 10 in an assembled state and ready for installation as shown and described above. The apparatus 10 includes a housing 14, which contains the holding structure 32 holding furled barrier material 12' having a portion 12 extending therefrom. The housing 14 is attached, for example, to an end cap 76 at the end having the tensioning mechanism, and another end cap at the opposite end that includes, for instance, a hole to receive the end of the holding structure 32 or an extension thereof to allow the holding structure 32 to freely pivot (not shown). As described above, an opening is provided that allows the barrier 12 having the elongated bar hook 28 attached thereto to always be exposed to a user.

Figure 3B:
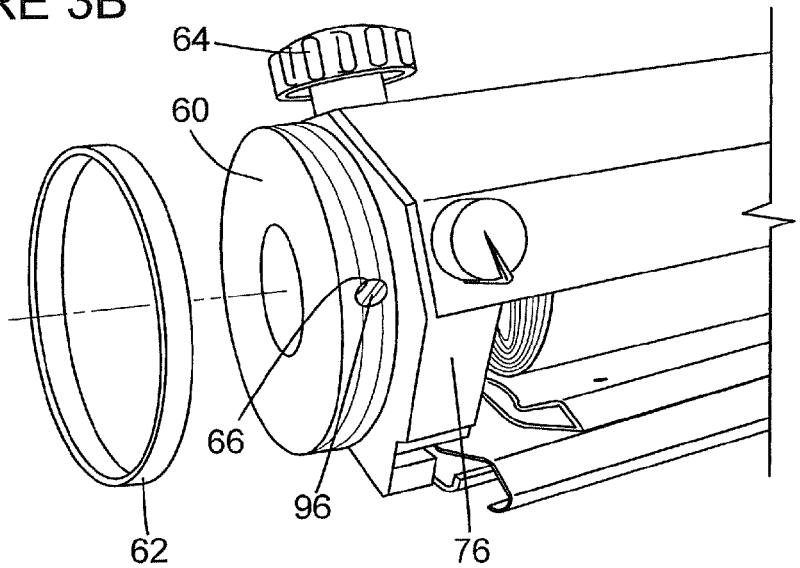
FIGS. 3B through 3F the pet barrier device of FIG. 3A depicting the tensioning mechanism in various stages of disassembly.

FIG. 3B shows an enlarged perspective view of an end of the apparatus 10 in a partially disassembled state with a ring 62 removed from the circumference of an annular adjustment member 60. Ring 62 serves to provide a braking surface (e.g., an O-ring formed of rubber or other suitable elastomer material) for the brake knob 64 (e.g., shown in the form of a multiple lobe threaded screw knob), where when set, pressure and frictional force between brake 64 and ring 62 is transmitted to adjustment member 60 to lock it in position. A set screw 96 set within a bore 66 on the edge of the adjustment member 60 secures the adjustment structure 60 to the end 68 of a torsion spring assembly 70 (shown with respect to FIGS. 4A through 4D) via an adaptor 72. For instance, as the set screw 96 is tightened, it compresses against, and can slightly indent, the adaptor 72 for mechanical engagement. The adaptor 72 is fixed to the end 68 of the torsion spring assembly 70 as described further herein with respect to FIGS. 4A through 4D, such that the adjustment structure 60 is in mechanical cooperation with the spring assembly 70. Thus, the adjustment structure 60 has rotational force imparted upon it due to the torsion spring forces.

Figure 3C:
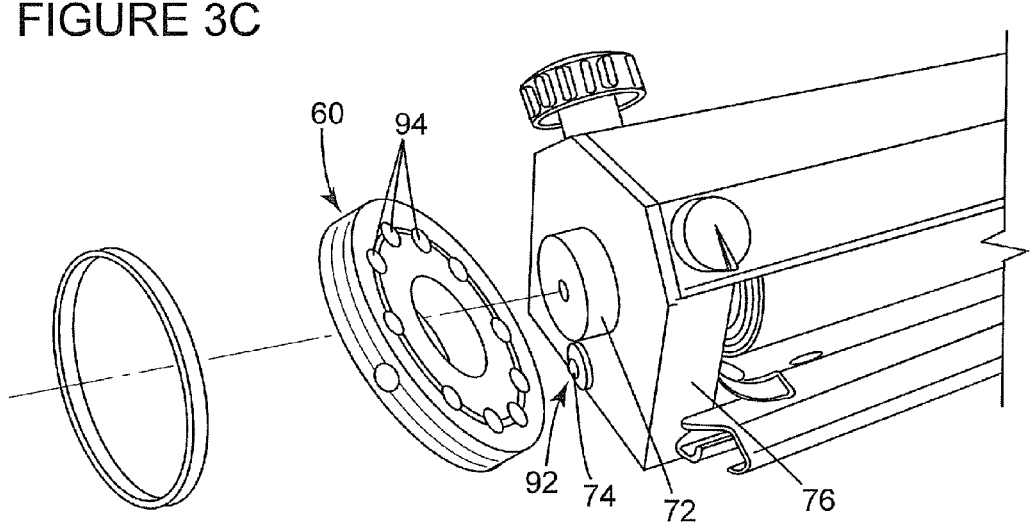

FIG. 3C shows the adjustment structure 60 removed from the torsion spring assembly 70 (by loosening the set screw 96, for example, in the form of a hexagonal recessed drive (Allen) screw). The surface of the adjustment structure 60 adjacent the end cap 76 includes a plurality of recessed ball detents 94, which accept a ball portion 74 of a ball bearing spring assembly 92.

Figure 3D:
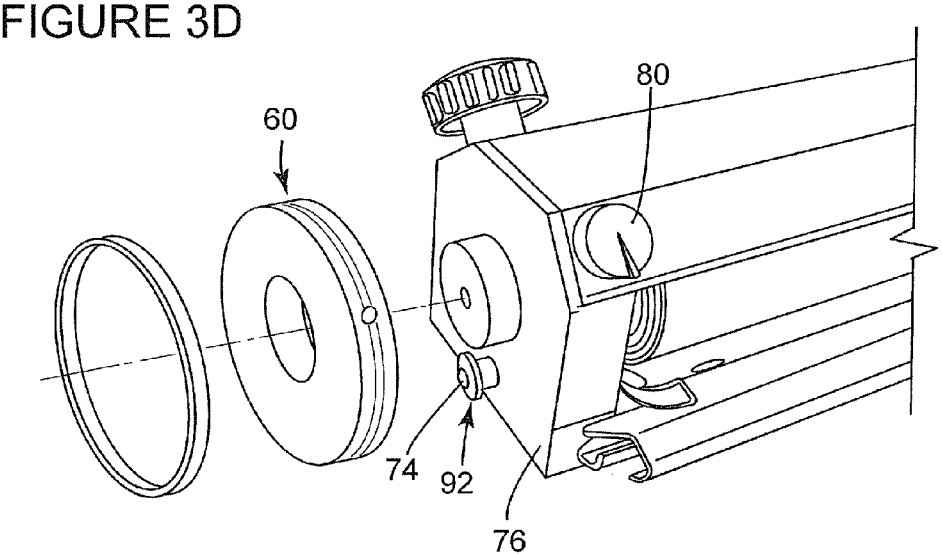

FIG. 3D shows the ball bearing spring assembly 92 partially removed from a hole within the end cap 76. As shown, the ball bearing spring assembly 92 includes the ball portion 74 seated upon a spring within a casing, having a flange to maintain the position of the assembly 92, i.e., prevent the assembly 92 from receding into the end cap 76.

Figure 3E:
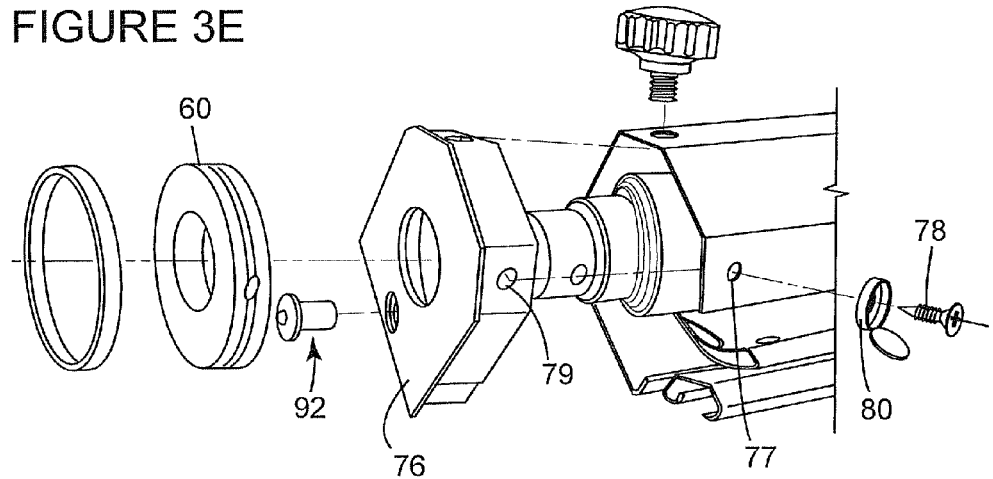

FIG. 3E shows ball bearing spring assembly 92 removed from the end cap 76. The end cap 76 can be removed from the housing 14 by removing a housing screw 78 from apertures 77, 79 which are upon the housing 14 and in the edge of the end cap 76, respectively. As shown, the screw 78 is encased in a screw cap 80 when screwed into through corresponding apertures 77, 79.

Figure 3F:
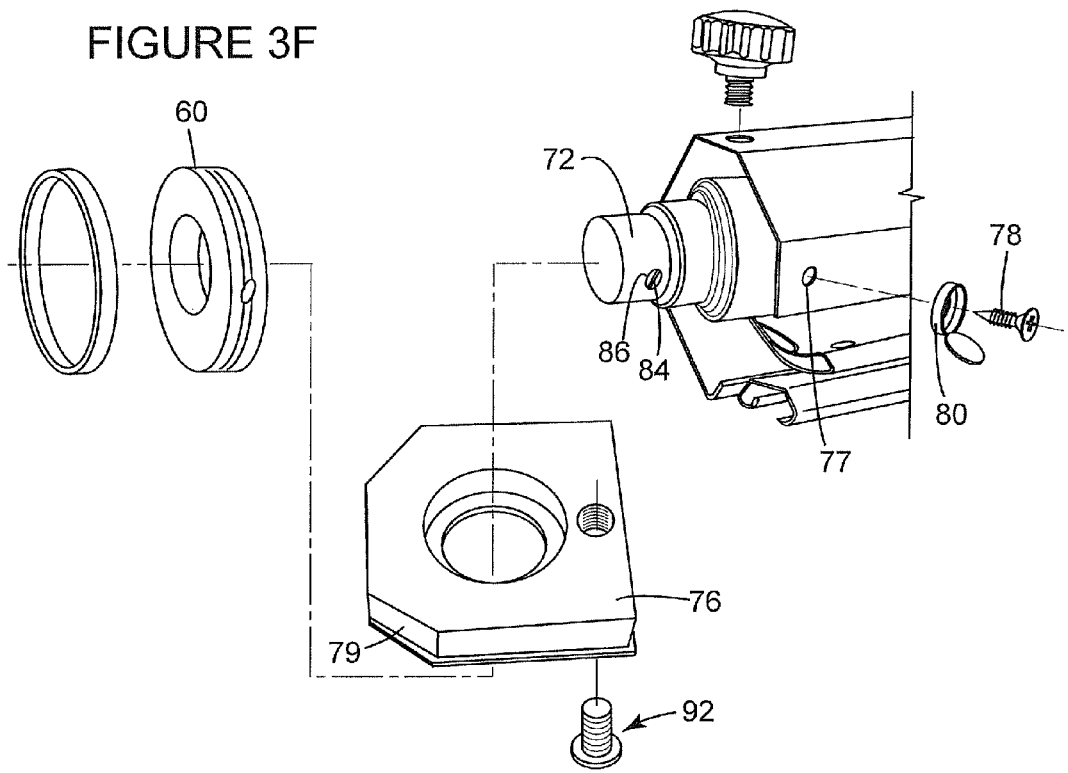

FIG. 3F shows the adaptor 72 attached to the end 68 of the torsion spring assembly 70. For instance, as shown in FIGS. 4A through 4D, the end 68 includes an extending tab integral with a central structure 82 of the torsion spring assembly 70. The adaptor 72 is configured and dimensioned to fit within the opening of the annular shaped adjustment structure 60, and is attached to a tab 67 at the end 68 of the torsion spring assembly 70. The adaptor 72 is affixed to the extending tab 67, for instance, with a screw 84 that is screwed through a threaded aperture 86 that extends through the edge of the adaptor 72 to allow the screw to compress against the tab 67.

Referring to FIGS. 4A through 4D, the spring assembly 70 is shown in various stages of disassembly for the purpose of viewing the components thereof. FIG. 4A shows the holding structure 32 having barrier material 12' furled therearound, with a cap member 97 partially separated from the end of the holding structure 32. In the assembled configuration, the cap member 97 is fixed to the end of the holding structure 32, for instance, by crimping, adhesive, fasteners, or a combination thereof. FIG. 4B shows the spring assembly 70 removed from the hollow holding structure. FIG. 4C shows the spring 98 upon a central structure 82, having a slotted end where an end of the spring 98 is inserted therein. Accordingly, when central structure 82 is rotated independently of the holding structure 32, by turning the tab 67 (described above as in mechanical cooperation with the adjustment structure 60 via the adaptor 72 and associated screws 96, 84), a rotational tension is imparted on the spring 98. FIG. 4D shows the end cap 97 removed from the end of the holding structure, showing an end disk 99 configured to be positioned on the end of the holding structure 32 (e.g., in the form of a circular disk). For instance, to secure the disk 99 to the holding structure 32, the edges of the end disk 99 can include one or more teeth that can sink into the end of the holding structure 32 (e.g., where the holding structure is formed of a suitable cardboard material). When the end cap 97 is positioned over the tab 67 and the disk 99, it is crimped or otherwise mechanically fastened to the end of the holding structure 32, allowing the tab 67 (thus this the central structure 82 and the spring 98) to rotate the spring 68 at the end connected to the central structure 82 via the slot, shown in FIG. 4C. Furthermore, the end of the spring 98 proximate the disk 99 is secured to the disk 99, for instance, using one or more suitable channels, apertures or other features that receive an end of the spring 98 that is suitably bent to fit into the one or more suitable channels, apertures or other features on the side of the disk 99 facing inside of the holding structure 32.

In certain embodiments, the tab 67 can be eliminated, for instance, and the central structure 82 can extend through a disk and end cap, similar to disk 99 and end cap 97, whereby the adjustment structure 60 can be fixed directly to the protruding portion of central structure 82, thereby eliminating the need for adaptor 74, particularly in embodiments where the outer diameter of the central structure 82 is slightly smaller than the inner diameter of the annulus of the adjustment structure 60.

Therefore, a user can easily adjust the tension of the barrier 12 by releasing the brake 64, rotating the adjustment structure to the desired tension, and resetting the brake 64. This action twists the spring 98 at the end attached to the central structure 82 as shown in FIG. 4C, and the torsion spring forces act upon the holding structure 32 through the disk 99 and/or the end cap 97. Accordingly, over time, as tension on the barrier 12 is reduced due to repeated use and the normal operation of torsion springs, the tension can easily be increased by a user as described, thereby extending the useful lifetime of the apparatus 10.

Figure 6A:
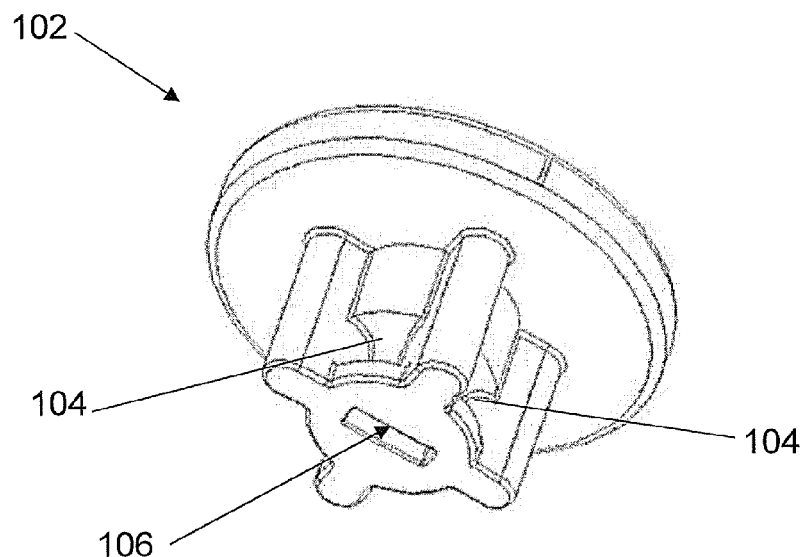
FIGS. 6A through 6D show various views of another embodiment of a tensioning mechanism.
Figure 6B:
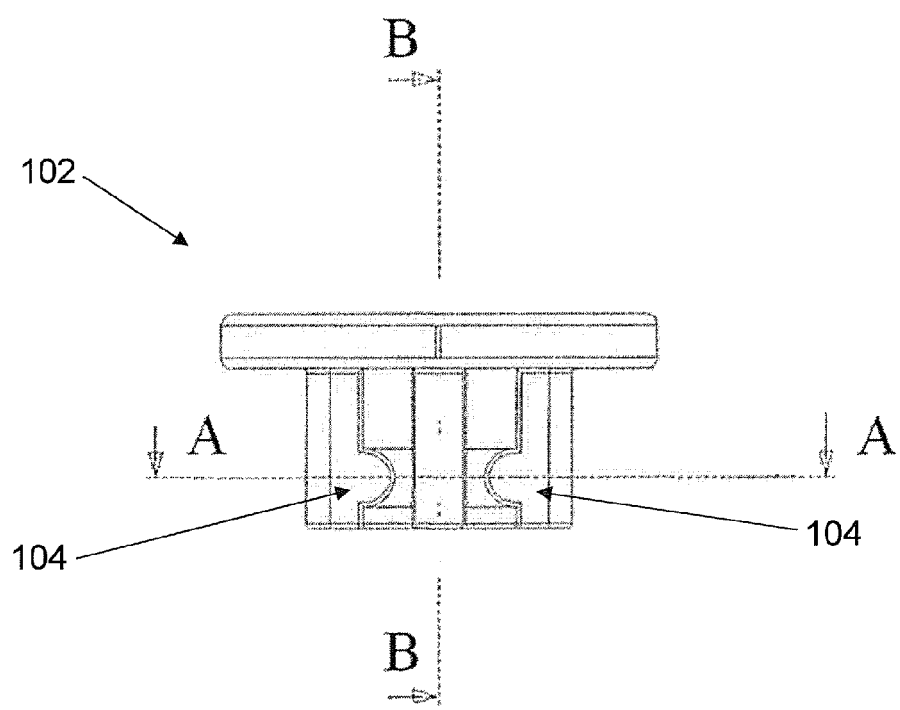
Figure 6C:
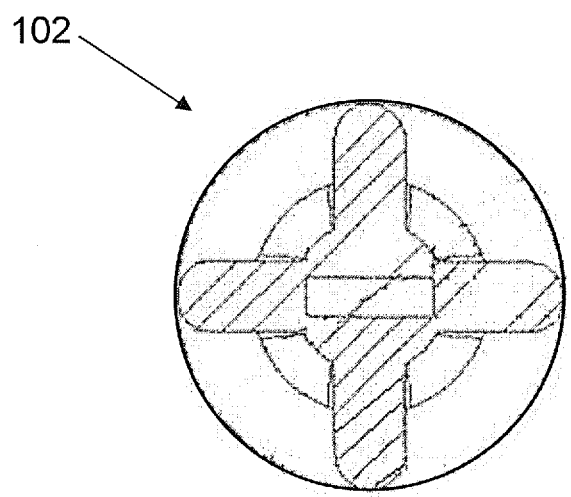
Figure 6D:
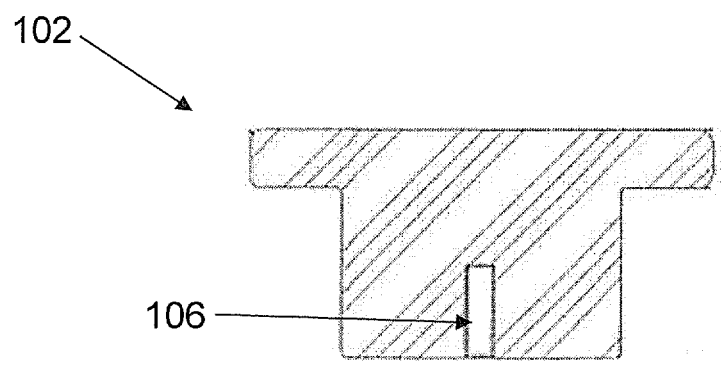

FIGS. 6A through 6D shows another embodiment of a tension mechanism 102. FIG. 6A shows a perspective view of the tension mechanism 102, FIG. 6B shows a side view of the tension mechanism 102, FIG. 6C shows a sectional view along line A-A of FIG. 6B, and FIG. 6D shows a sectional view along line B-B of FIG. 6B.

The one piece design of the tension wheel 102 includes four recessed portions 104 to set and reset the tension of the device by receiving a brake screw. In order to adjust the tension, a brake screw (not shown, in the same position as brake knob 64 in the embodiments of FIGS. 3A-3E) is loosened, the tension wheel is rotated as necessary to tighten the spring 98 upon the central structure 82, and the brake screw is retightened so that tip of the brake screw is set within one of the recessed portions 104 of the tension wheel 102.

Preferably, the tension wheel 102 is manufactured to strict dimensional control so that a brake screw (not shown in FIGS. 6A-6D), e.g., a recessed screw in the position of brake knob 64 shown in FIGS. 3A-3E and passing through the end cap 76 in the same manner as brake knob 64, can effectively maintain the tension setting by engaging one of the recessed portions 104 and thus holding the tension wheel 102 in place. In contrast to the locking system of adjustment structure 60 shown with respect to FIGS. 3A-3F, where a ring 62 provides a braking surface for the brake knob 64 to lock adjustment structure 60 in position, tension wheel 102 is locked in position internal to the housing 14.

Note that the pet barrier including tension wheel 102 includes the same components as the pet barrier described above, with the exception that the adjustment structure 60 (having ball detents 94, bore 66 and set screw 96, and associated parts ring 62, adaptor 72, ball bearing spring assembly 92 having ball portion 74, brake knob 64 (but as described above, a brake screw is used through a bore similar or the same as bores in the end cap 76) is replaced by tension wheel 102.

In addition, the tension wheel 102 includes a slot 106 where tab 67 at the end 68 of the torsion spring assembly 70 fits. Accordingly, turning the tension wheel 102 adjusts the torsion spring assembly 70.

In a particularly advantageous embodiment, the pet barrier is a self contained retractable pet barrier. The barrier desirably includes a tear and puncture resistant, opaque material to provide both a physical and psychological barrier for your small to medium sized animal. The self contained housing attaches bi-directionally adjacent to any door and contains the first or fixed end of the barrier. The second or exposed end of the barrier is always accessible and is fitted with a handle or knob device for retracting and engaging the barrier to a single receiving device mounted on the door itself. As the door is opened, with the pet barrier fully engaged, the barrier is automatically drawn from the housing providing the barrier to deter your animal from escape through the open door.

As noted above, the pet barrier can be mounted bi-directionally—that is, the pet barrier can be mounted to accommodate a door that opens from the left or the right side. The set screw and the clutch wheel can be positioned on the bottom end of the installed housing unit. If the set screw and tension wheel are in this position, the housing unit can be removed from the door jamb, and the housing unit inverted so that the set screw and tension wheel are located at the top of the housing unit before the tension is tightened.

While preferred embodiments have been shown and described, various modifications and substitutions can be made thereto without departing from the spirit and scope of the invention. Accordingly, it is to be understood that the present invention has been described by way of illustrations and not limitation.

The invention claimed is:

1. A pet barrier comprising:
   a housing containing a barrier, the barrier having a first end attached to a holding structure, the holding structure rotating with respect to the housing, the barrier being furled around the holding structure, and the barrier having a second end exposed from the housing, the second end of the barrier extended from the housing and including a first elongated bar hook attached to the second end of the barrier having at least a hooking portion on a side of the elongated bar hook opposite the side that this attached to the barrier;

a tensioning mechanism including a torsion spring assembly operably associated with the holding structure;

an adjustment structure for adjusting the tension of the spring assembly by rotational action which adjusts the torsion spring forces that act upon the associated holding structure and thereby adjusting tension in the barrier as it is extended from the holding structure; and a brake that locks the adjustment structure to a set tension of the spring assembly by engagement with a portion of the housing and/or a portion fixed with respect to the housing;

wherein constant retraction forces act upon the barrier as it is unfurled from around the holding structure, wherein the housing includes an opening for extraction of the barrier that is configured and dimensioned to prevent the barrier from becoming completely furled around the holding structure.

2. The pet barrier as in claim 1, wherein the opening for extraction of the barrier has a width that it less than the overall thickness of the first elongated bar hook.

3. The pet barrier as in claim 2, wherein the first elongated bar hook has a C-shaped cross section or a G-shaped cross section, where the bottom portion of the C-shape or G-shape is dimensioned larger than the opening for extraction of the barrier.

4. The pet barrier as in claim 1, wherein the opening for extraction of the barrier has a length that it less than the overall length of the first elongated bar hook.

5. The pet barrier as in claim 1, wherein the first elongated bar hook has a C-shaped cross section.

6. The pet barrier as in claim 1, wherein the first elongated bar hook has a G-shaped cross section.

7. The pet barrier as in claim 1, wherein the first elongated bar hook has a J-shaped cross section.

8. The pet barrier as in claim 1, wherein the barrier is formed of a tear and puncture resistant, opaque material.

9. The pet barrier as in claim 1, wherein the spring assembly operably associated with the holding structure includes a spring having a core with a central structure through the core, the central structure having a first end within the holding structure and a second end extending from the holding structure, the spring having a first end being fixed with respect to the central structure proximate the second end of the central structure, the spring also having a second end that is fixed with respect to the holding structure.

10. The pet barrier as in claim 9, wherein the second end of the spring is fixed with respect to the holding structure by attachment to first end of the central structure by virtue of a leg of the spring extending into a slot in the central structure.

11. The pet barrier as in claim 9, wherein the second end of the spring is fixed with respect to the holding structure with a disk that is attached to the holding structure with a leg of the spring extending into a corresponding structure on the disk.

12. The pet barrier as in claim 9, wherein the adjustment structure is in mechanical cooperation with the second end of the central structure of the spring assembly.

13. The pet barrier as in claim 12, wherein the adjustment structure comprises
a member having a central opening, a thickness, and a bore through the thickness extending from an edge of the member to the central opening;
a set screw through the bore and in mechanical cooperation with the second end of the central structure of the spring assembly.

14. The pet barrier as in claim 13, wherein the brake includes a knob with a screw that engages an end cap on an end of the housing having the adjustment structure, the knob dimensioned and configured to frictionally engage the edge of the member of the adjustment structure.

15. The pet barrier as in claim 14, wherein the edge of the member of the adjustment structure includes a removable engaging member of rubber or elastomer material.

16. The pet barrier as in claim 13, further comprising:
an end cap on an end of the housing having the adjustment structure including a ball bearing spring assembly having a ball bearing extending outwardly from the end cap, and wherein the member of the adjustment structure includes a plurality of recessed ball detents that engage the ball bearing.

17. The pet barrier as in claim 13, wherein the central structure of the spring assembly includes a tab that extends outwardly from the central structure, and wherein set screw is in mechanical cooperation with the tab.

18. The pet barrier as in claim 17, further comprising an adaptor that fits over the tab, wherein the set screw engages the adaptor.

19. The pet barrier as in claim 12, further comprising:
an end cap on an end of the housing having the adjustment structure, the end cap including an opening for accessing the second end of the central structure of the spring assembly; wherein the adjustment structure comprises
a tension adjustment member having a portion that extends through the opening of the end cap and engages the second end of the central structure of the spring assembly; and
wherein the brake comprises a set screw through an edge of the end cap in mechanical cooperation the portion of the tension adjustment member to lock the tension adjustment member.

20. The pet barrier as in claim 19, wherein the central structure of the spring assembly includes a tab that extends outwardly from the central structure, and wherein the portion of the tension adjustment member includes a slot to engage the tab.

21. A pet barrier comprising:
a housing containing a barrier, the barrier having a first end attached to a holding structure, the holding structure rotating with respect to the housing, the barrier being furled around the holding structure, and the barrier having a second end exposed from the housing, the second end of the barrier extended from the housing and including a hook attached to the second end of the barrier;
a tensioning mechanism including a torsion spring assembly operably associated with the holding structure;
an adjustment structure for adjusting the tension of the spring assembly by rotational action which adjusts the torsion spring forces that act upon the associated holding structure and thereby adjusting tension in the barrier as it is extended from the holding structure; and
a brake that locks the adjustment structure to a set tension of the spring assembly by engagement with a portion of the housing and/or a portion fixed with respect to the housing; and
wherein constant retraction forces act upon the barrier as it is unfurled from around the holding structure.

* * * * *